(12) United States Patent
Lee et al.

(10) Patent No.: US 12,294,684 B2
(45) Date of Patent: May 6, 2025

(54) METHOD FOR ENCODING IMMERSIVE IMAGE AND METHOD FOR DECODING IMMERSIVE IMAGE

(71) Applicant: ELECTRONICS AND TELECOMMUNICATIONS RESEARCH INSTITUTE, Daejeon (KR)

(72) Inventors: Gwang-Soon Lee, Daejeon (KR); Hong-Chang Shin, Daejeon (KR); Jun-Young Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 259 days.

(21) Appl. No.: 17/858,196

(22) Filed: Jul. 6, 2022

(65) Prior Publication Data
US 2023/0011027 A1 Jan. 12, 2023

(30) Foreign Application Priority Data

Jul. 7, 2021 (KR) .................. 10-2021-0089360
Jun. 13, 2022 (KR) .................. 10-2022-0071597

(51) Int. Cl.
*H04N 13/161* (2018.01)
*H04N 13/111* (2018.01)
(Continued)

(52) U.S. Cl.
CPC ......... *H04N 13/161* (2018.05); *H04N 13/111* (2018.05); *H04N 13/128* (2018.05); *H04N 13/178* (2018.05); *H04N 19/597* (2014.11)

(58) Field of Classification Search
CPC .. H04N 13/161; H04N 13/111; H04N 13/128; H04N 13/178; H04N 19/597;
(Continued)

(56) References Cited

U.S. PATENT DOCUMENTS 10,045,048 B2 8/2018 Nam et al.
2020/0413094 A1* 12/2020 Lee ................. H04N 19/167
(Continued)

FOREIGN PATENT DOCUMENTS

KR 10-2016-0072101 A 6/2016
KR 10-2021-0023671 A 3/2021
(Continued)

OTHER PUBLICATIONS

Sung-Gyun Lim et al., "Description of MPEG Immersive Video Core Experiments 3," ISO/IEC JTC 1/SC 29/WG 04 N0020, Oct. 16, 2020.

*Primary Examiner* — Farzana Hossain
(74) *Attorney, Agent, or Firm* — LRK PATENT LAW FIRM

(57) ABSTRACT

Disclosed herein is a method for encoding an immersive image. The method includes detecting a non-diffuse surface in a first texture image of a first view, generating an additional texture image from the first texture image based on the detected non-diffuse surface, performing pruning on the additional texture image based on a second texture image of a second view, generating a texture atlas based on the pruned additional texture image, and encoding the texture atlas.

11 Claims, 8 Drawing Sheets

(51) Int. Cl.
  *H04N 13/128*   (2018.01)
  *H04N 13/178*   (2018.01)
  *H04N 19/597*   (2014.01)

(58) Field of Classification Search
  CPC .... H04N 19/124; H04N 19/132; H04N 19/46;
              H04N 19/70; G06T 9/001
  See application file for complete search history.

(56)         References Cited

U.S. PATENT DOCUMENTS

| | | | |
|---|---|---|---|
| 2021/0233282 A1 | 7/2021 | Kim et al. | |
| 2021/0383590 A1* | 12/2021 | Roimela | H04N 19/597 |
| 2022/0217314 A1* | 7/2022 | Oh | H04N 21/44 |
| 2022/0343549 A1* | 10/2022 | Chupeau | H04N 21/816 |
| 2022/0345742 A1* | 10/2022 | Jeong | H04N 19/105 |
| 2023/0224447 A1* | 7/2023 | Ward | H04N 13/161 |
| | | | 348/43 |
| 2023/0343010 A1* | 10/2023 | Kwatra | G06T 13/205 |
| 2023/0362409 A1* | 11/2023 | Chupeau | G06V 10/762 |
| 2023/0370635 A1* | 11/2023 | Van Geest | H04N 19/184 |
| 2024/0155100 A1* | 5/2024 | Kroon | H04N 21/21805 |

FOREIGN PATENT DOCUMENTS

| | | |
|---|---|---|
| KR | 10-2021-0036834 A | 4/2021 |
| KR | 10-2021-0084242 A | 7/2021 |

\* cited by examiner

METHOD FOR ENCODING IMMERSIVE IMAGE AND METHOD FOR DECODING IMMERSIVE IMAGE

CROSS REFERENCE TO RELATED APPLICATIONS

This application claims the benefit of Korean Patent Application No. 10-2021-0089360, filed Jul. 7, 2021, and No. 10-2022-0071597, filed Jun. 13, 2022, which are hereby incorporated by reference in their entireties into this application.

BACKGROUND OF THE INVENTION

1. Technical Field

The present disclosure relates to a method for encoding/decoding an immersive image that supports motion parallax for rotational and translational movement.

2. Description of Related Art

Virtual-reality service is evolving to provide a service in which a sense of immersion and realism is maximized by generating an omnidirectional image in the form of a photorealistic image or Computer Graphics (CG) and reproducing the same in a Head-Mounted Display (HMD), a smartphone, or the like. It is currently known that it is required to support 6 Degrees of Freedom (6DoF) in order to reproduce a natural and immersive omnidirectional image through an HMD. In the case of a 6DoF image, an image in which free movement in six directions, e.g., (1) leftward/rightward rotation, (2) upward/downward rotation, (3) leftward/rightward translation, (4) upward/downward translation, and so on, is possible has to be provided through the screen of an HMD. However, most omnidirectional images based on actual images support only rotational movement. Accordingly, research on fields such as technology for acquiring and reproducing 6DoF omnidirectional images is actively underway.

SUMMARY OF THE INVENTION

An object of the present disclosure is to prevent the quality of an image for a non-diffuse surface, the color value of which changes depending on the viewpoint at the time of rendering, from being degraded.

Another object of the present disclosure is to provide a method for generating multiple texture/depth patches for a single non-diffuse surface.

The technical objects to be achieved by the present disclosure are not limited to the above-mentioned technical objects, and other technical objects that have not been mentioned will be readily apparent to those who have ordinary knowledge in the technical field to which the present disclosure pertains from the following description.

A method for encoding an immersive image according to the present disclosure includes detecting a non-diffuse surface in a first texture image of a first view, generating an additional texture image from the first texture image based on the detected non-diffuse surface, performing pruning on the additional texture image based on a second texture image of a second view, generating a texture atlas based on the pruned additional texture image, and encoding the texture atlas.

A method for decoding an immersive image according to the present disclosure includes decoding a texture atlas and synthesizing a viewport image based on the decoded texture atlas. Here, the texture atlas includes multiple patches for a non-diffuse surface of a subject.

In the method for encoding an immersive image according to the present disclosure, the pruned additional texture image may be the additional texture image from which a data region duplicated in the second texture image is removed, and for the duplicated data region, information about the difference from the second texture image may be encoded as metadata.

In the method for encoding an immersive image according to the present disclosure, the information about the difference may indicate at least one of a difference in an average value in a histogram distribution for the duplicated data region between the additional texture image and the second texture image, a difference in a standard deviation therefor, or a ratio of color values therefor, or a combination thereof.

The method for encoding an immersive image according to the present disclosure may further include generating an additional depth image, corresponding to the additional texture image, from a first depth image of the first view.

The method for encoding an immersive image according to the present disclosure may further include performing pruning on the additional depth image based on a second depth image of the second view and generating a depth atlas based on the pruned additional depth image.

The method for encoding an immersive image according to the present disclosure may further include encoding information about pruning priority for the additional depth image.

In the method for encoding an immersive image according to the present disclosure, a view identifier different from the view identifier of the first texture image may be assigned to the additional texture image, and information indicating the view identifier assigned to the additional texture image may be encoded.

The method for encoding an immersive image according to the present disclosure may further include encoding scaling-related information pertaining to a patch extracted from the pruned additional depth image as metadata.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
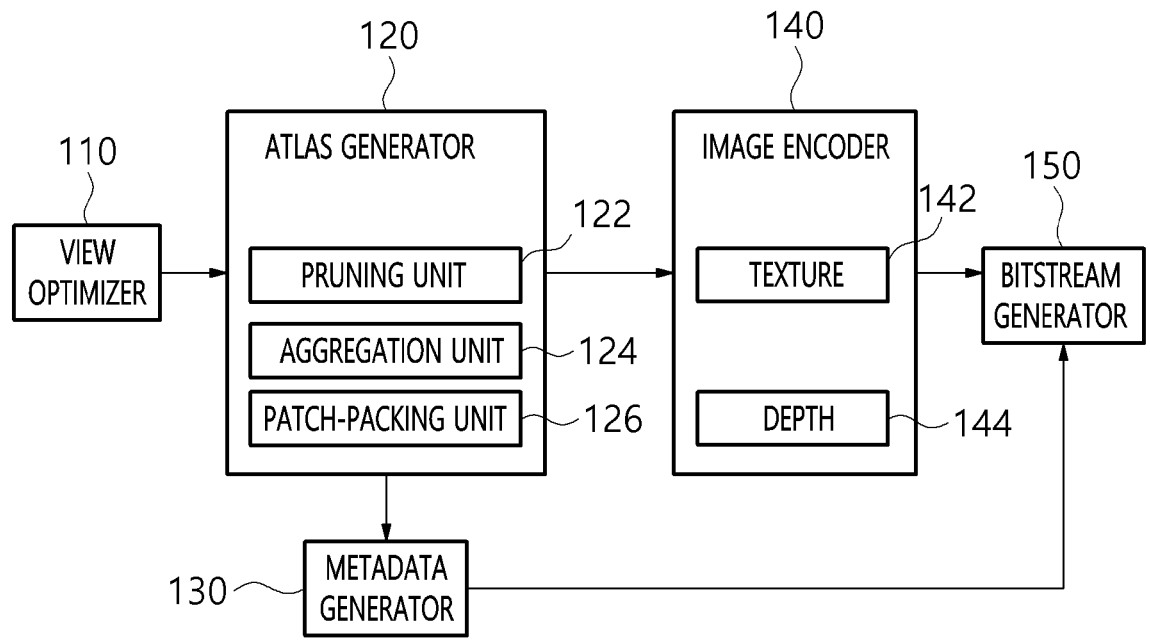
FIG. 1 is a block diagram of an apparatus for processing an immersive image according to an embodiment of the present disclosure.

The present disclosure may be variously changed and may have various embodiments, and specific embodiments will be described in detail below with reference to the attached drawings. However, it should be understood that those embodiments are not intended to limit the present disclosure to specific disclosure forms, and that they include all changes, equivalents or modifications included in the spirit and scope of the present disclosure. In the drawings, similar reference numerals are used to designate the same or similar functions in various aspects. The shapes, sizes, etc. of elements in the drawings may be exaggerated to make the description clear. Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the present disclosure in relation to an embodiment. Further, it should be understood that the locations or arrangement of individual elements in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the present disclosure, terms such as "first" and "second" may be used to describe various elements, but the elements are not restricted by the terms. The terms are used only to distinguish one element from another element. For example, a first element may be named a second element without departing from the scope of the present disclosure. Likewise, a second element may be named a first element. The terms "and/or" may include combinations of a plurality of related described items or any of a plurality of related described items.

It will be understood that when an element in the present disclosure is referred to as being "connected" or "coupled" to another element, the element may be directly connected or coupled to the other element, or intervening elements may be present between the two elements. In contrast, it will be understood that when an element is referred to as being "directly connected or coupled", no intervening elements are present between the two elements.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present disclosure as long as it does not depart from the essence of the present disclosure.

The terms used in the present disclosure are merely used to describe specific embodiments and are not intended to limit the present disclosure. A singular expression includes a plural expression unless a description to the contrary is specifically pointed out in context. In the present disclosure, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. In other words, when a specific element is referred to as being "included", elements other than the corresponding element are not excluded, but additional elements may be included in embodiments of the present disclosure or the scope of the present disclosure.

Some elements of the present disclosure may not be essential components for performing the substantial functions in the present disclosure, or may be optional elements merely for improving performance. The present disclosure may be embodied by including only elements essential to embodiments of the present disclosure, excluding elements used merely to improve performance, and structures including only essential elements and excluding optional elements used merely to improve performance also fall within the scope of the present disclosure.

Hereinafter, embodiments of the present disclosure will be described in detail below with reference to the accompanying drawings. In the following description of the embodiments of the present disclosure, detailed descriptions of known functions or configurations which are deemed to obscure the gist of the present specification will be omitted, the same reference numerals are used to designate the same components throughout the drawings, and repeated descriptions of the same components will be omitted.

An immersive image is an image, the viewport of which can be dynamically changed when the view position of a user is changed. In order to implement an immersive image, multiple input images are required. Each of the multiple input images may be referred to as a source image or a view image. The respective view images may be assigned different view indexes.

Immersive images may be classified into types such as 3 Degrees of Freedom (3DoF), 3DoF+, Windowed-6DoF, 6DoF, and the like. A 3DoF-based immersive image may be implemented using only a texture image. In contrast, in order to render an immersive image including depth information, such as a 3DoF+ image, a 6DoF image, or the like, not only a texture image but also a depth image are required.

The embodiments to be described are assumed to be intended for processing of an immersive image including depth information, such as a 3DoF+ image and/or a 6DoF image. Also, a view image is assumed to be formed of a texture image and a depth image.

FIG. 1 is a block diagram of an apparatus for processing an immersive image according to an embodiment of the present disclosure.

Referring to FIG. 1, the apparatus for processing an immersive image according to the present disclosure may include a view optimizer 110, an atlas generator 120, a metadata generator 130, an image encoder 140, and a bitstream generator 150.

The apparatus for processing an immersive image encodes an immersive image by receiving multiple pairs of images, internal camera parameters, and external camera parameters as input values. Here, the multiple pairs of images include texture images (attribute components) and depth images (geometry components). The respective pairs may have different views. Accordingly, a pair of input images may be referred to as a view image. Each view image may be identified by an index. Here, the index assigned to each view image may be referred to as a view or a view index.

The internal camera parameters include a focal length, the position of a principal point, and the like, and the external camera parameters include the position of a camera, the orientation thereof, and the like. The internal camera parameters and the external camera parameters may be treated as camera parameters or view parameters.

The view optimizer 110 divides view images into multiple groups. The view images are divided into multiple groups, whereby encoding processing may be individually performed on each of the groups. For example, view images captured by N spatially consecutive cameras may be classified into one group. Accordingly, view images having relatively coherent depth information may be classified into the same group, whereby rendering quality may be improved.

Also, information dependency between groups is removed, whereby a spatial random access service, which selectively takes only information about the region that is being viewed by a user and performs rendering thereon, may be realized.

Dividing view images into multiple groups may be optional.

Also, the view optimizer 110 may classify view images into a basic image and an additional image. The basic image is a view image having the highest pruning priority, and indicates an image that is not to be pruned, and the additional image is a view image having lower pruning priority than the basic image.

The view optimizer 110 may select at least one of the view images as a basic image. The view images that are not selected as the basic image may be classified as additional images.

The view optimizer 110 may select the basic image in consideration of the view positions of the view images. For example, the view image, the view position of which is at the center, among the multiple view images, may be selected as the basic image.

Alternatively, the view optimizer 110 may select the basic image based on the camera parameters. Specifically, the view optimizer 110 may select the basic image based on at least one of a camera index, the priority between cameras, the position of a camera, or whether a camera is a camera of a region of interest, or a combination thereof.

For example, at least one of the view image having the smallest camera index, the view image having the largest camera index, the view image having a camera index that is the same as a predefined value, the view image captured by the camera having the highest priority, the view image captured by the camera having the lowest priority, the view image captured by a camera at a predefined position (e.g., at the center position), or the view image captured by a camera of a region of interest, or a combination thereof may be selected as the basic image.

Alternatively, the view optimizer 110 may select the basic image based on the quality of the view images. For example, the view image having the highest quality, among the view images, may be selected as the basic image.

Alternatively, the view optimizer 110 may check data redundancy between the view images and select the basic image in consideration of the proportion of data duplicated in other view images. For example, the view image having the highest proportion of data duplicated in other view images or the view image having the lowest proportion of data duplicated in other view images may be selected as the basic image.

Multiple view images may be set as the basic image.

The atlas generator 120 generates a pruning mask by performing pruning. Then, the atlas generator 120 extracts a patch using the pruning mask and generates an atlas by combining the basic image and/or the extracted patch. When the view images are divided into multiple groups, this process may be individually performed for each of the groups.

The generated atlas may be formed of a texture atlas and a depth atlas. The texture atlas is an image in which a basic texture image and/or texture patches are combined, and the depth atlas is an image in which a basic depth image and/or depth patches are combined.

The atlas generator 120 may include a pruning unit 122, an aggregation unit 124, and a patch-packing unit 126.

The pruning unit 122 performs pruning on an additional image based on pruning priority. Specifically, pruning may be performed on the additional image using a reference image having higher pruning priority than the additional image.

The reference image includes the basic image. Also, depending on the pruning priority of the additional image, the reference image may further include another additional image.

Whether it is possible to use an additional image as a reference image may be selectively determined. For example, when settings are made such that an additional image is not used as a reference image, only the basic image may be set as the reference image.

Conversely, when settings are made such that an additional image can be used as a reference image, the basic image and another additional image having higher pruning priority than a corresponding additional image may be set as the reference image.

Through the pruning process, redundant data common both to the additional image and to the reference image may be removed. Specifically, data duplicated in the reference image may be removed from the additional image through a warping process based on a depth image. For example, the depth values of the additional image and those of the reference image are compared with each other pixel by pixel, and when the difference therebetween is equal to or less than a threshold value, the pixel may be determined to be duplicate data.

As the result of performing pruning, a pruning mask including information about whether each pixel in the additional image is valid or invalid may be generated. The pruning mask may be a binary image indicating whether each pixel in the additional image is valid or invalid. For example, in the pruning mask, the pixel determined to be data duplicated in the reference image may have a value of 0, and the pixel determined to be data that is not duplicated in the reference image may have a value of 1.

A region that is not duplicated may have a non-rectangular shape, but a patch is limited to having only a rectangular shape. Therefore, a patch may include not only a valid region but also an invalid region. Here, the valid region indicates a region formed of pixels that are not duplicated between the additional image and the reference image. That is, the valid region indicates a region including data that is not included in the reference image but is included in the additional image. The invalid region indicates a region formed of pixels that are the same between the additional image and the reference image. The pixels/data included in the valid region may be referred to as valid pixels/valid data, and the pixels/data included in the invalid region may be referred to as invalid pixels/invalid data.

The aggregation unit 124 combines pruning masks, each of which is generated for each frame, for each intra-period.

Also, the aggregation unit 124 may extract patches from the combined pruning mask image through a clustering process. Specifically, a rectangular region, including valid data, in the combined pruning mask image may be extracted as a patch. Because a rectangular patch is extracted, regardless of the shape of a valid region, the patch extracted from a valid region having a non-rectangular shape may include invalid data as well as valid data.

Here, the aggregation unit 124 may again segment an L-shaped or C-shaped patch, which decreases encoding efficiency. Here, the L-shaped patch indicates a patch in which the distribution of a valid region has an shape, and the C-shaped patch indicates a patch in which the distribution of a valid region has a 'C' shape.

When the distribution of a valid region has an or 'C' shape, the size of an invalid region in the patch is relatively large. Accordingly, the L-shaped or C-shaped patch is segmented into multiple patches, whereby encoding efficiency may be improved.

In the case of a view image on which pruning is not performed, the entire view image may be treated as a single patch. Specifically, an entire 2D image, acquired by developing the view image on which pruning is not performed in a predetermined projection format, may be treated as a single patch. The projection format may include at least one of an Equirectangular Projection Format (ERP), a Cubemap, or a perspective projection format, or a combination thereof.

Here, the view image on which pruning is not performed means the basic image having the highest pruning priority. Alternatively, the basic image and an additional image, data of which is not duplicated in the reference image, may be defined as the view image on which pruning is not performed. Alternatively, regardless whether an additional image includes data duplicated in the reference image, an additional image arbitrarily excluded from the target to be pruned may be defined as the view image on which pruning is not performed. That is, the additional image including data duplicated in the reference image may also be defined as the view image on which pruning is not performed.

The patch-packing unit 126 packs a patch into a rectangular image. When a patch is packed, a change in the size of the patch, and transformation, such as rotation or flipping of the patch, may be performed. The image into which patches are packed may be defined as an atlas.

Specifically, the patch-packing unit 126 may generate a texture atlas by packing a basic texture image and/or texture patches, and may generate a depth atlas by packing a basic depth image and/or depth patches.

In the case of the basic image, the entirety thereof may be treated as a single patch. That is, the basic image may be packed into the atlas without change. When an entire image is treated as a single patch, the patch may be referred to as a complete view or a complete patch.

The number of atlases generated by the atlas generator 120 may be set based on at least one of the arrangement structure of a camera rig, the accuracy of a depth map, or the number of view images, or a combination thereof.

The metadata generator 130 generates metadata for image synthesis. The metadata may include at least one of camera-related data, pruning-related data, atlas-related data, or patch-related data, or a combination thereof.

The pruning-related data includes information for setting the pruning priority between view images. For example, at least one of a flag indicating whether a view image is a root node, or a flag indicating whether a view image is a leaf node, or a combination thereof may be encoded. The root node indicates the view image having the highest pruning priority (that is, the basic image), and the leaf node indicates the view image having the lowest pruning priority.

When a view image is not a root node, a parent node index may be additionally encoded. The parent node index may be the image index of the view image corresponding to the parent node.

Alternatively, when a view image is not a leaf node, a child node index may be additionally encoded. The child node index may be the image index of the view image corresponding to the child node.

The atlas-related data may include at least one of information about the size of an atlas, information about the number of atlases, information about the priority between atlases, or a flag indicating whether an atlas includes a complete view, or a combination thereof. The size of an atlas may include at least one of information about the size of a texture atlas, or information about the size of a depth atlas, or a combination thereof. Here, a flag indicating whether the size of the depth atlas is the same as the size of the texture atlas may be additionally encoded. When the size of the depth atlas differs from the size of the texture atlas, information about the reduction ratio of the depth atlas (e.g., scaling-related information) may be additionally encoded. The atlas-related information may be included in the "View parameters list" entry in a bitstream.

For example, geometry_scale_enabled_flag, which is syntax indicating whether a depth atlas is allowed to be scaled down, may be encoded/decoded. When the value of the syntax 'geometry_scale_enabled_flag' is 0, this indicates that scaling down of a depth atlas is not allowed. In this case, the depth atlas has the same size as the texture atlas.

When the value of the syntax 'geometry_scale_enabled_flag' is 1, this indicates that a depth atlas is allowed to be scaled down. In this case, information for determining the reduction ratio of the depth atlas may be additionally encoded/decoded. For example, geometry_scaling_factor_x, which is syntax indicating the reduction ratio in the widthwise direction of the depth atlas, and geometry_scaling_factory_y, which is syntax indicating the reduction ratio in the lengthwise direction of the depth atlas, may be additionally encoded/decoded.

In the apparatus for outputting an immersive image, the information about the reduction ratio of the depth atlas is decoded, after which the reduced depth atlas may be restored to the original size thereof.

The patch-related data includes information for specifying the position and/or size of a patch in an atlas image, the view image in which the patch is included, and the position and/or size of the patch in the view image. For example, at least one of position information, indicating the position of a patch in an atlas image, or size information, indicating the size of the patch in the atlas image, or a combination thereof may be encoded. Also, a source index for identifying the view image from which the patch is derived may be encoded. The source index is the index of the view image that is the original source of the patch. Also, position information indicating the position corresponding to the patch in the view image or size information indicating the size corresponding to the patch in the view image may be encoded. The patch-related information may be included in the 'Atlas data' entry in the bitstream.

The image encoder 140 encodes an atlas. When view images are classified into multiple groups, an atlas may be generated for each of the groups. Accordingly, image encoding may be individually performed for each of the groups.

The image encoder 140 may include a texture image encoder unit 142 for encoding a texture atlas and a depth image encoder unit 144 for encoding a depth atlas.

The bitstream generator 150 generates a bitstream based on the encoded image data and metadata. The generated bitstream may be transmitted to the apparatus for outputting an immersive image.

Figure 2:
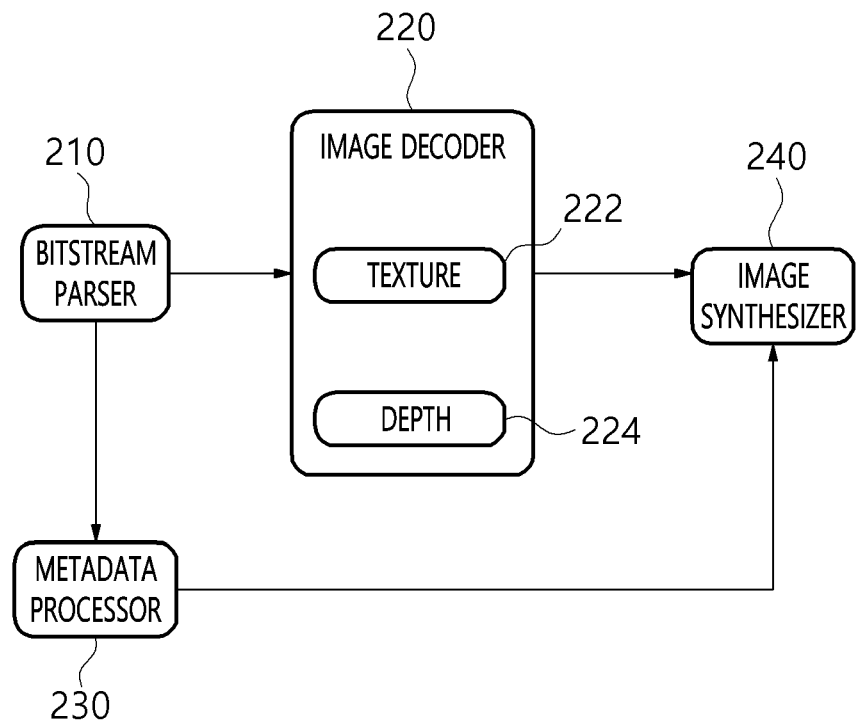
FIG. 2 is a block diagram of an apparatus for outputting an immersive image according to an embodiment of the present disclosure.

FIG. 2 is a block diagram of an apparatus for outputting an immersive image according to an embodiment of the present disclosure.

Referring to FIG. 2, the apparatus for outputting an immersive image according to the present disclosure may include a bitstream parser 210, an image decoder 220, a metadata processor 230, and an image synthesizer 240.

The bitstream parser 210 parses image data and metadata in a bitstream. The image data may include data of an encoded atlas. When a spatial random access service is supported, only a partial bitstream pertaining to the view position of a user may be received.

The image decoder 220 decodes the parsed image data. The image decoder 220 may include a texture image decoder unit 222 for decoding a texture atlas and a depth image decoder unit 224 for decoding a depth atlas.

The metadata processor 230 unformats the parsed metadata.

The unformatted metadata may be used in order to synthesize an image from a specific viewpoint. For example, when information about movement of a user is input to the apparatus for outputting an immersive image, the metadata processor 230 may determine an atlas required for image synthesis, patches required therefor, and/or the positions/sizes of the patches in the atlas in order to reproduce a viewport image depending on the movement of the user.

The image synthesizer 240 may synthesize a viewport image dynamically depending on movement of a user. Specifically, the image synthesizer 240 may extract patches required for synthesizing a viewport image from an atlas using the information determined by the metadata processor 230 depending on movement of the user. Specifically, the atlas including information about a view image required for synthesizing a viewport image and patches, extracted from the view image and included in the atlas, are extracted, and the extracted patches are synthesized, whereby a viewport image may be generated.

Figure 3:
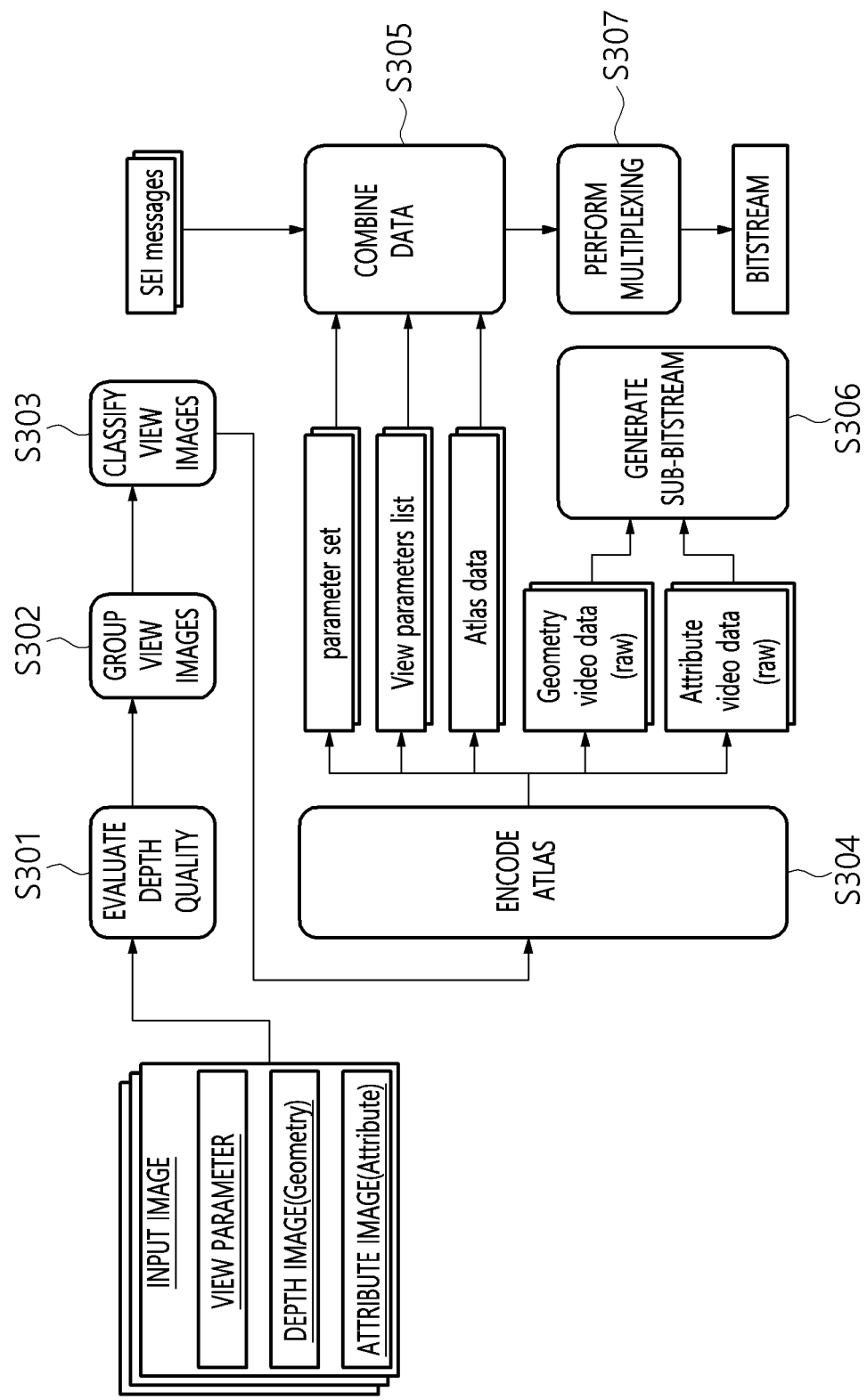
FIG. 3 is a flowchart of a method for processing an immersive image.
Figure 5:
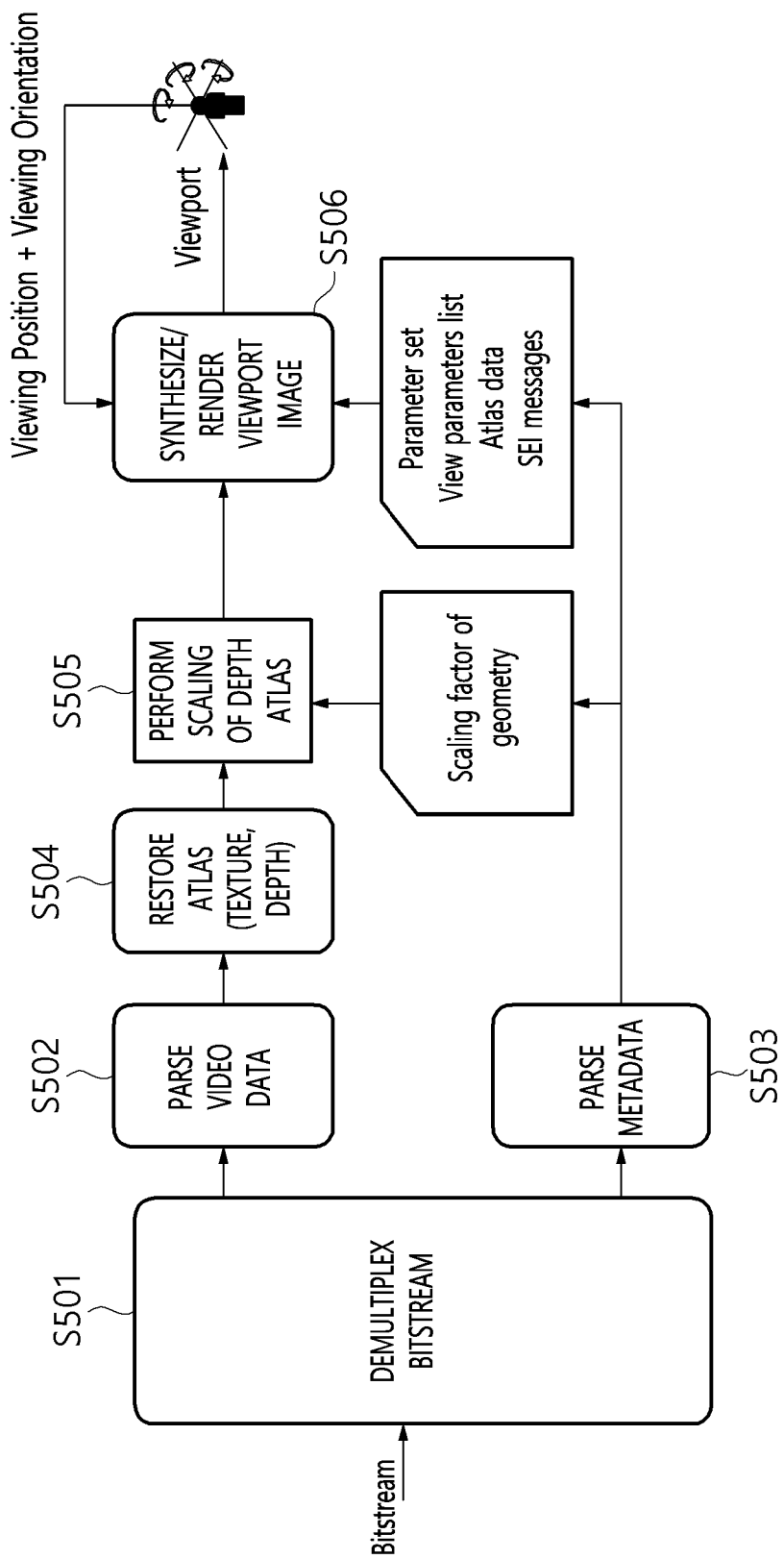
FIG. 5 is a flowchart of a method for outputting an immersive image.

FIG. 3 and FIG. 5 respectively illustrate a flowchart of a method for processing an immersive image and a flowchart of a method for outputting an immersive image.

In the flowcharts described below, an italicized or underlined element indicates input or output data for performing each step. Also, arrows in the flowcharts described below indicate the processing sequence of steps. Here, steps that are not connected by an arrow means that the temporal order of the steps is not determined or that the steps may be processed in parallel. Also, an immersive image may be processed or output in a sequence different from the sequence illustrated in the flowcharts described below.

An apparatus for processing an immersive image may receive at least one of multiple input images, internal camera parameters, or external camera parameters, or a combination thereof, and may evaluate the quality of a depth map using the input data at step S301. Here, the input image may be formed of a pair comprising a texture image (attribute components) and a depth image (geometry components).

The apparatus for processing an immersive image may classify the input images into multiple groups based on proximity of the positions of multiple cameras at step S302. By classifying the input images into multiple groups, pruning and encoding may be individually performed on a group of images that have a relatively coherent depth value by being captured by adjacent cameras. Also, through the above process, a spatial random access service, in which rendering is performed using only information about the region that is being viewed by a user, may be realized.

However, steps S301 and S302 described above are merely optional procedures, and are not necessarily performed.

When the input images are classified into multiple groups, the procedure to be described below may be individually performed for each of the groups.

The apparatus for processing an immersive image may determine the pruning priority of the view images at step S303. Specifically, the view images may be classified into a basic image and additional images, and the pruning priority between the additional images may be set.

Figure 4:
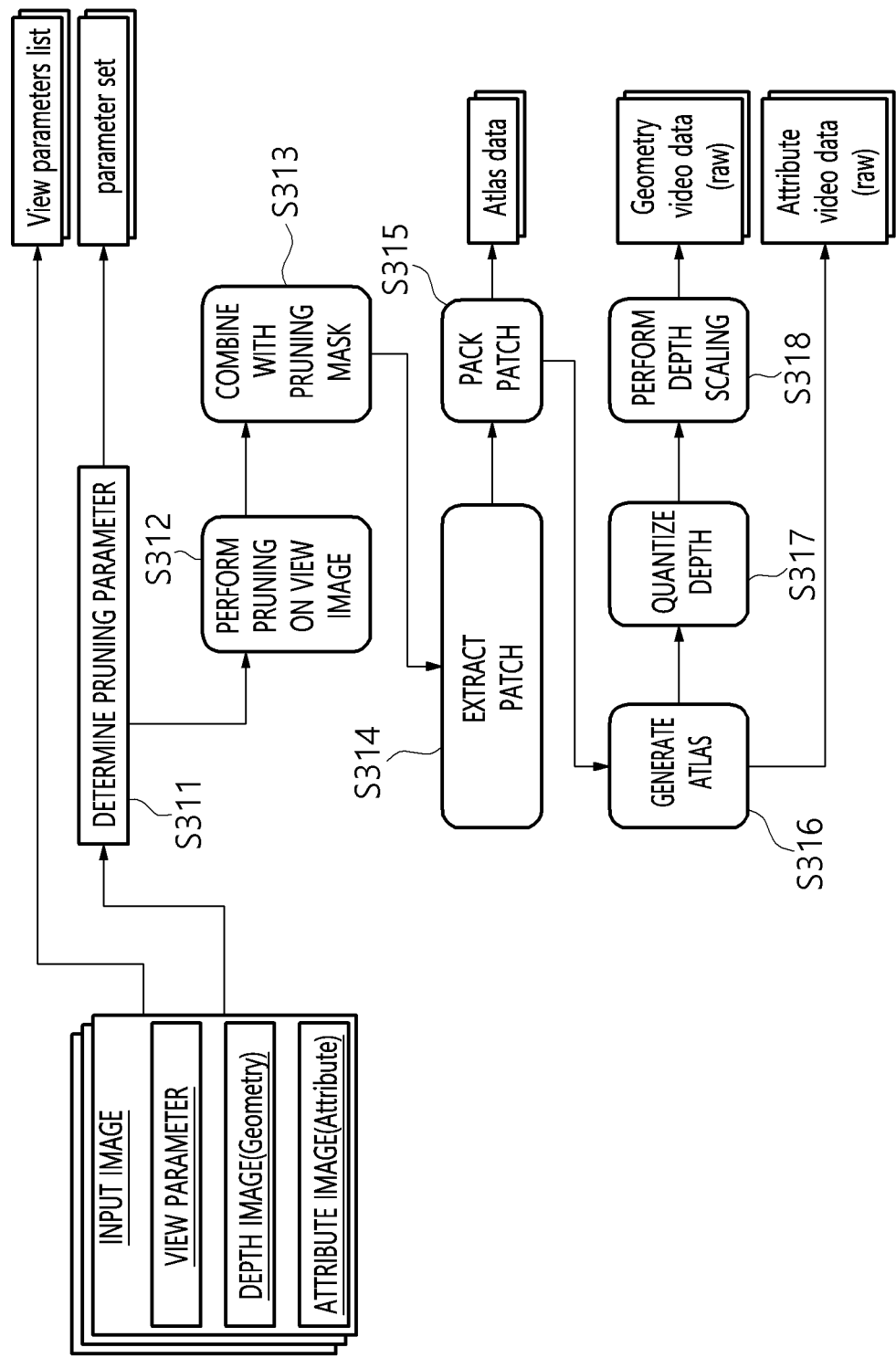
FIG. 4 is a flowchart of a process of encoding an atlas.

Subsequently, an atlas is generated based on the pruning priority, and the generated atlas may be encoded at step S304. The process of encoding atlases is illustrated in detail in FIG. 4.

Specifically, pruning parameters (e.g., the pruning priority and the like) are set at step S311, and pruning may be performed on the view images based on the set pruning parameters at step S312. As a result of performing pruning, the basic image having the highest priority is maintained without change. In contrast, pruning is performed on the additional image, whereby redundant data common both to the additional image and to a reference image is removed. Through a warping process based on a depth image, redundant data common both to the additional image and to the reference image may be removed.

As the result of performing pruning, pruning masks may be generated. When pruning masks are generated, the pruning masks are combined for each intra-period at step S313. Then, using the combined pruning masks, patches may be extracted from the texture image and the depth image at step S314. Specifically, the texture images and the depth images are masked by the combined pruning mask, and patches may be extracted.

Here, in the case of the view image on which pruning is not performed (e.g., the basic image), the entirety thereof may be treated as a single patch.

Subsequently, the extracted patches are packed at step S315, and an atlas may be generated at step S316. Specifically, a texture atlas and a depth atlas may be generated.

Also, the apparatus for processing an immersive image may set a threshold value for determining whether a pixel is valid or invalid based on the depth atlas at step S317. For example, a pixel having a value less than the threshold value in the atlas may be an invalid pixel, and a pixel having a value equal to or greater than the threshold value in the atlas may be a valid pixel. The threshold value may be set for each image or for each patch.

In order to reduce the amount of data, the size of the depth atlas may be reduced by a specific ratio at step S318. When the size of the depth atlas is reduced, information about the reduction ratio of the depth atlas (e.g., a scaling factor) may be encoded. In the apparatus for outputting an immersive image, the reduced depth atlas may be restored to the original size thereof using the size of the texture atlas and the scaling factor.

The metadata (e.g., a parameter set, a view parameter list, or atlas data) generated in the atlas-encoding process is combined with Supplemental Enhancement Information (SEI) at step S305. Also, the texture atlas and the depth atlas are encoded separately, whereby sub-bitstreams may be generated at step S306. Then, the encoded metadata and the encoded atlases are multiplexed, whereby a single bitstream may be generated at step S307.

The apparatus for outputting an immersive image demultiplexes the bitstream received from the apparatus for processing an immersive image at step S501. As a result, video data, that is, atlas data and metadata, may be respectively extracted at steps S502 and S503.

The apparatus for outputting an immersive image may restore an atlas based on parsed video data at step S504. Here, when the depth atlas is scaled down by a specific ratio, information related thereto is acquired from the metadata, whereby the depth atlas may be scaled to the original size thereof at step S505.

When movement of a user occurs, an atlas required for synthesizing a viewport image depending on the movement of the user is determined based on the metadata, and patches included in the atlas may be extracted therefrom. Then, a viewport image may be generated and rendered at step S506. Here, in order to synthesize the generated patches, information about the size/position of each of the patches, camera parameters, and the like may be used.

When light is reflected or refracted on the surface of a subject, the color value of the surface of the subject may change depending on the angle from which an image of the subject is captured. Accordingly, a color value corresponding to a single position in 3D space may differ in respective view images depending on the viewpoint.

A conventional method determines whether a specific pixel is redundant data depending on the depth value thereof in view images. However, when whether a pixel is redundant data is determined based on the depth value, the position at which the color value changes depending on the viewpoint may be processed as redundant data even though the texture is not redundant. Accordingly, when an atlas is generated by performing pruning on multiple view images capturing a subject that reflects light, distortion may be caused when a viewport image is synthesized.

The present disclosure intends to propose a method for solving the above problem while reducing the amount of data to be added. Also, for convenience of description, a region, corresponding to the surface of a subject that reflects or refracts light, in an image is referred to as a specular region or a non-Lambertian region. Further, synthesizing (or rendering) a viewport image based on a view image including a non-diffuse surface is referred to as view-dependent rendering, which is called as non-lambertian surface. Specifically, view-dependent rendering may be a rendering method in which a pixel in a non-specular region is represented using a single color value regardless of the viewpoint, but a pixel in a specular region is represented using different color values depending on the viewpoint as a result of reflection or refraction of light.

Figure 6:
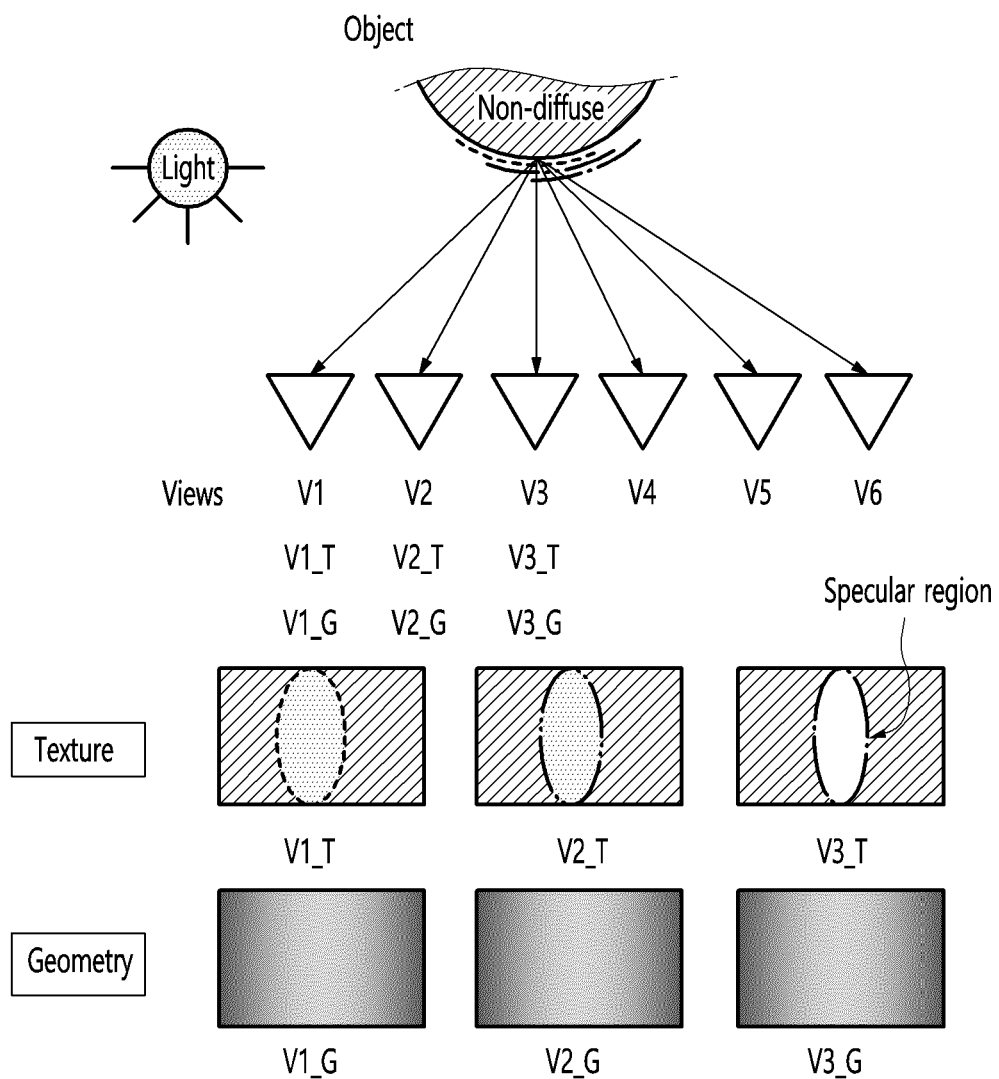
FIGS. 6 to 9 illustrate a method for generating an atlas for view-dependent rendering according to an embodiment of the present disclosure.
Figure 7:
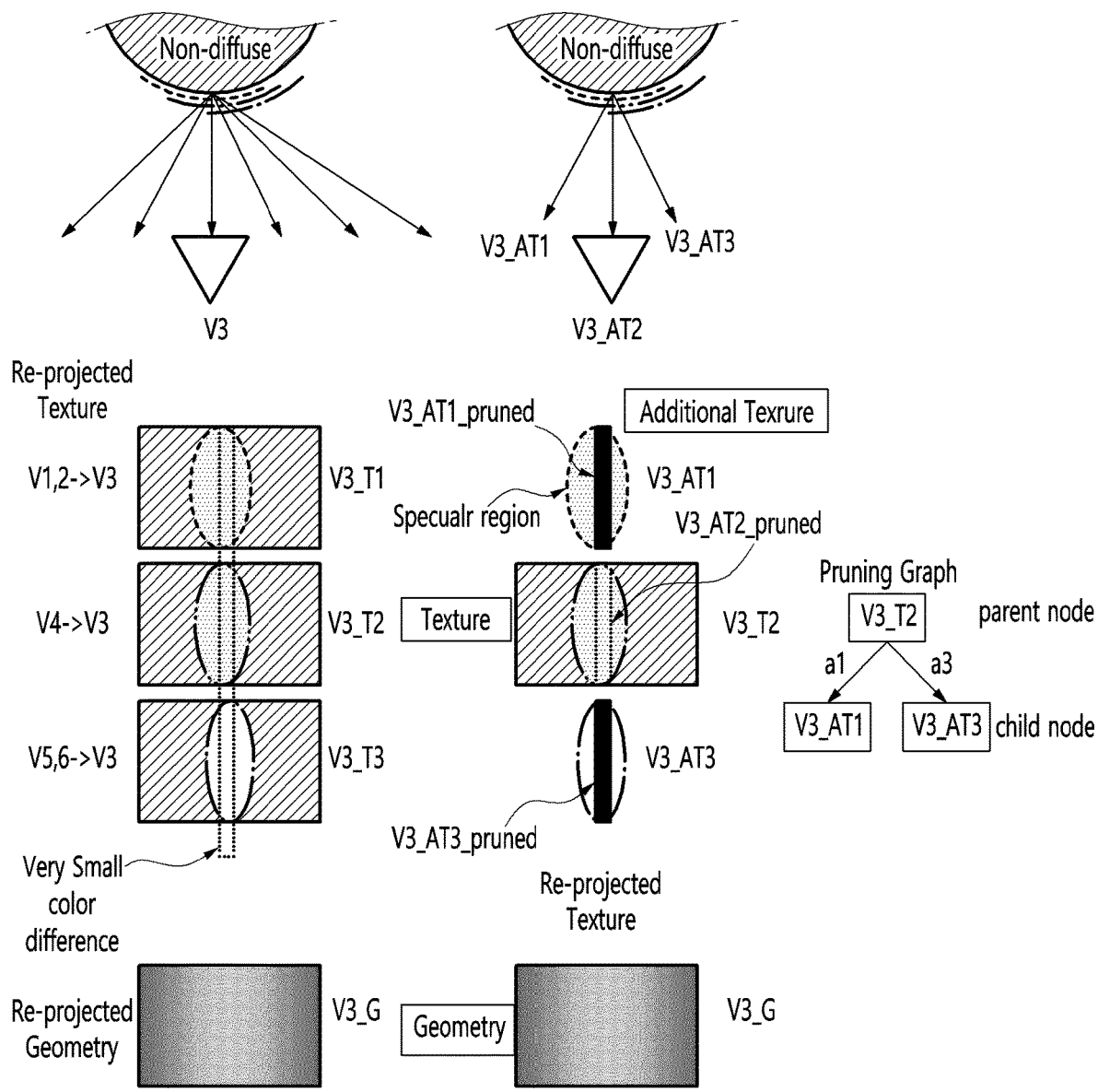

FIGS. 6 to 7 illustrate a method for generating an atlas for view-dependent rendering according to an embodiment of the present disclosure.

When a subject having a non-diffuse surface is illuminated, different reflection images are acquired at respective camera positions, as in the example illustrated in FIG. 6. That is, because the same subject is captured, the depth values (geometry) in the acquired images are the same as each other, but the color values and/or the reflection patterns of a specular region therein may differ from each other.

In order to perform pruning on view images having the above-described characteristics, the view images are reprojected, whereby reprojected images may be generated. Specifically, a texture image and a depth image are respectively reprojected, whereby a reprojected texture image (reprojected texture) and a reprojected depth image (reprojected geometry) may be generated.

If necessary, a number of reprojected images less than the number of view images may be generated through multi-view image processing. For example, when N view images are present, fewer than N reprojected images may be generated.

In the embodiment of FIG. 7, the view images are assumed to be reprojected to the position of V3. Also, it is assumed that view images V1 and V2 are combined after being reprojected to the position of view image V3 and that view images V5 and V6 are combined after being reprojected to the position of view image V3.

Pruning may be performed on the reprojected images. Specifically, pruning may be performed separately on the reprojected texture images and the reprojected depth images. When pruning is performed on the reprojected texture images, whether samples are redundant data may be determined based on whether the difference between the samples is equal to or less than a threshold value. Similarly, when pruning is performed on the reprojected depth images, whether samples are redundant data may be determined based on whether the difference between the samples is equal to or less than a threshold value.

Here, because multiple view images have similar depth values for the same subject, many parts of information are removed through pruning. FIG. 7 illustrates the case in which all of the information on the depth images reprojected to the position of view image V3 is removed through pruning performed on the reprojected depth images, whereby only a single representative depth image (V3_G of FIG. 7) is generated.

In contrast, due to the effect of reflection on the surface of a subject, data about the surface of the subject in the texture image may not be removed even though pruning is performed. That is, when pruning is performed on the texture images, different pieces of data may be present for the same position.

Here, only a specular region in an image is detected through additional image processing, such as image segmentation or the like, whereby an additional texture image may be generated. This may be referred to as specular region detection.

FIG. 7 illustrates an example in which additional texture images V3_AT1 and V3_AT3 are generated for the reprojected image in which view images V1 and V2 are combined and the reprojected image in which view images V5 and V6 are combined, respectively, through specular region detection.

In consideration of the characteristics of a non-diffuse surface in which the color value changes depending on the viewpoint, the additional texture image may be packed into an atlas without change. That is, the additional texture image may be packed into the atlas as a single patch. However, when the additional texture image is packed into the atlas without change, the amount of data in the atlas is increased, which may cause a problem of decreased encoding efficiency.

Accordingly, rather than packing the additional texture image into the atlas without change, pruning is performed on the additional texture image, and patches to be packed into the atlas may be generated based on the additional texture image on which pruning is performed.

Specifically, pruning may be performed on the additional texture image based on a representative texture image V3_T2. The representative texture image V3_T2 indicates the parent node of the additional texture images.

Meanwhile, when pruning is performed on the texture images, if the difference between samples pertaining to the same position is less than a threshold value, the samples may be determined to be redundant data.

However, in this case, a specific region in a specular region may be determined to be redundant data and removed (that is, pruned) because the difference between texture samples is less than a threshold value, but another region in the specular region may not be pruned because the difference between texture samples is greater than the threshold value. In this case, a very small difference between the region that is pruned and the region that is not pruned may cause distortion, such as blocking or the like, when view-dependent rendering is performed.

In order to prevent distortion occurring at the time of rendering, if pruning is not performed even when the difference between the texture samples is less than the threshold value, a specular region that is not pruned becomes larger, which increases the amount of data in the atlas.

Accordingly, the present disclosure proposes to remove data in a specular region through pruning when texture samples therefor have a difference less than a threshold value, and to generate separate metadata on the difference between the removed data and a representative texture image that is not removed (that is, a basic texture image) and encode/decode the same. When a view image is rendered, the texture sample values in the specular region are calibrated using the metadata, whereby distortion may be minimized.

Specifically, in the example shown in FIG. 7, the regions V3_AT1_pruned and V3_AT3_pruned, in which a difference from the representative texture image V3_T2 is equal to less than a threshold value, are illustrated as being respectively removed from the additional texture images, that is, V3_AT1 and V3_AT3, through pruning, but the other regions are illustrated as not being removed.

In this case, information indicating the difference between the representative texture image V3_T2 and the pruned region may be encoded/decoded as metadata. For example, information a1, indicating the difference between a region corresponding to the pruned region V3_AT1_pruned in the additional texture image V3_AT1 and a region corresponding thereto in the representative texture image V3_T2, and information a3, indicating the difference between a region corresponding to the pruned region V3_AT3_pruned in the additional texture image V3_AT3 and a region corresponding thereto in the representative texture image V3_T2, may be encoded/decoded as metadata. At the time of view-dependent rendering, the region corresponding to the pruned region is calibrated using the metadata, whereby image quality degradation may be mitigated.

Here, the difference may be determined based on at least one of a difference in the average value in a histogram distribution between the additional texture image and the representative texture image, corresponding to the parent node of the additional texture image in a pruning graph, a difference in the standard deviation therebetween, or the ratio of the color values therebetween, or a combination thereof.

As in the example illustrated in FIG. 7, the representative texture image V3_T2 may be set as a parent node and the additional texture images may be set as child nodes in the pruning graph.

The pruning order and structures of the additional texture images may follow the pruning order and structures of the view images.

In another example, the pruning order and structure of the additional texture images may be determined independently of the pruning order and structures of the view images. In this case, the pruning order and structures of the additional texture images may be generated as separate metadata and transmitted. For example, at least one of information for identifying the representative texture image (that is, the parent node image) of the additional texture images, or information about the pruning priority between the additional texture images, or a combination thereof may be encoded/decoded. As in the example illustrated in FIG. 7, the non-diffuse surface of a subject in 3D space has characteristics in which the color value thereof is changed depending on the viewpoint, but the depth values of the subject in the respective views are similar. Accordingly, as in the example illustrated in FIG. 7, a depth atlas may be generated using only a single depth image (that is, the representative depth image V3_G).

However, when a single depth image is not sufficient to accurately specify the position of a subject from respective viewpoints, it is desirable to generate an atlas by further taking into consideration additional depth images.

Figure 8:
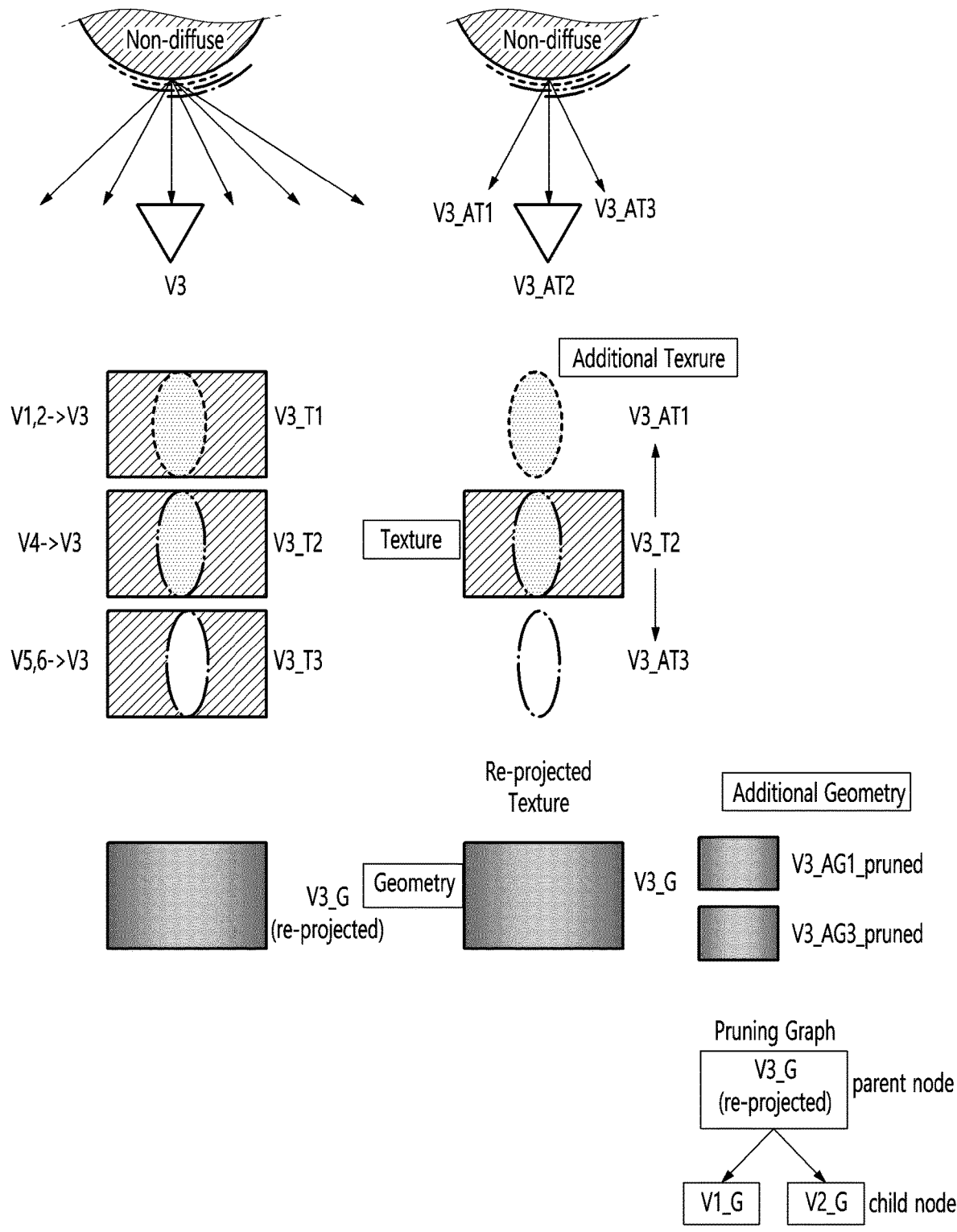

FIG. 8 illustrates a method for generating an atlas for view-dependent rendering according to an embodiment of the present disclosure.

In FIG. 8, an example in which additional depth images V3_AG1 Pruned and V3_AG3 Pruned that are pruned are generated in addition to a representative depth image V3_G is illustrated.

An additional depth image (additional geometry) may be a depth image corresponding to an additional texture image. For example, a region corresponding to an additional texture image V3_AT1, generated through specular region detection, may be extracted from the depth image of a reprojected image in which view images V1 and V2 are combined, and set as an additional depth image. Also, a region corresponding to an additional texture image V3_AT3, generated through specular region detection, may be extracted from the depth image of a reprojected image in which view images V5 and V6 are combined, and set as an additional depth image.

When additional depth images are generated, the additional depth images may be additionally packed into an atlas along with a representative depth image.

Because the extent to which additional depth images contribute to view-dependent rendering is minor, even though pruning is performed on the additional depth images, the quality of the rendered image is not greatly degraded. Accordingly, as in the example illustrated in FIG. 8, the additional depth image corresponding to the texture image is pruned, and a patch to be packed into an atlas is generated based on the pruned additional depth image, whereby degradation of the quality of the rendered image may be minimized and the amount of data to be encoded/decoded may be reduced.

Specifically, the additional depth image corresponding to the additional texture image V3_AT1 generated through specular region detection is pruned based on the representative depth image (that is, the depth image V3_G of V3, which is a parent node), whereby a pruned additional depth image V3_AG1 Pruned may be generated. Also, the additional depth image corresponding to the additional texture image V3_AT3 generated through specular region detection is pruned based on the representative depth image V3_G, whereby a pruned additional depth image V3_AG3 Pruned may be generated.

As in the example illustrated in FIG. 8, the representative depth image V3_G may be set as a parent node and depth images corresponding to the additional texture images may be set as child nodes in the pruning graph.

The pruning order and structures of the additional depth images may follow the pruning order and structures of the view images.

In another example, the pruning order and structures of the additional depth images may be set to be the same as the pruning order and structures of the additional texture images.

In another example, the pruning order and structures of the additional depth images may be determined independently. In this case, the pruning order and structures of the additional depth images may be generated as separate metadata and transmitted. For example, at least one of information for identifying the representative depth image (that is, the parent node image) of the additional depth images, or information about the pruning priority between the additional depth images, or a combination thereof may be encoded/decoded. Information (e.g., a flag) indicating whether the pruning order and structures of the additional depth images are the same as the pruning order and structures of the additional texture images may be additionally encoded/decoded.

In order to reduce the amount of data in an atlas, the additional depth image may be packed into the atlas after reducing the size (resolution) of the additional depth image, rather than packing the additional depth image having the original size into the atlas.

Figure 9:
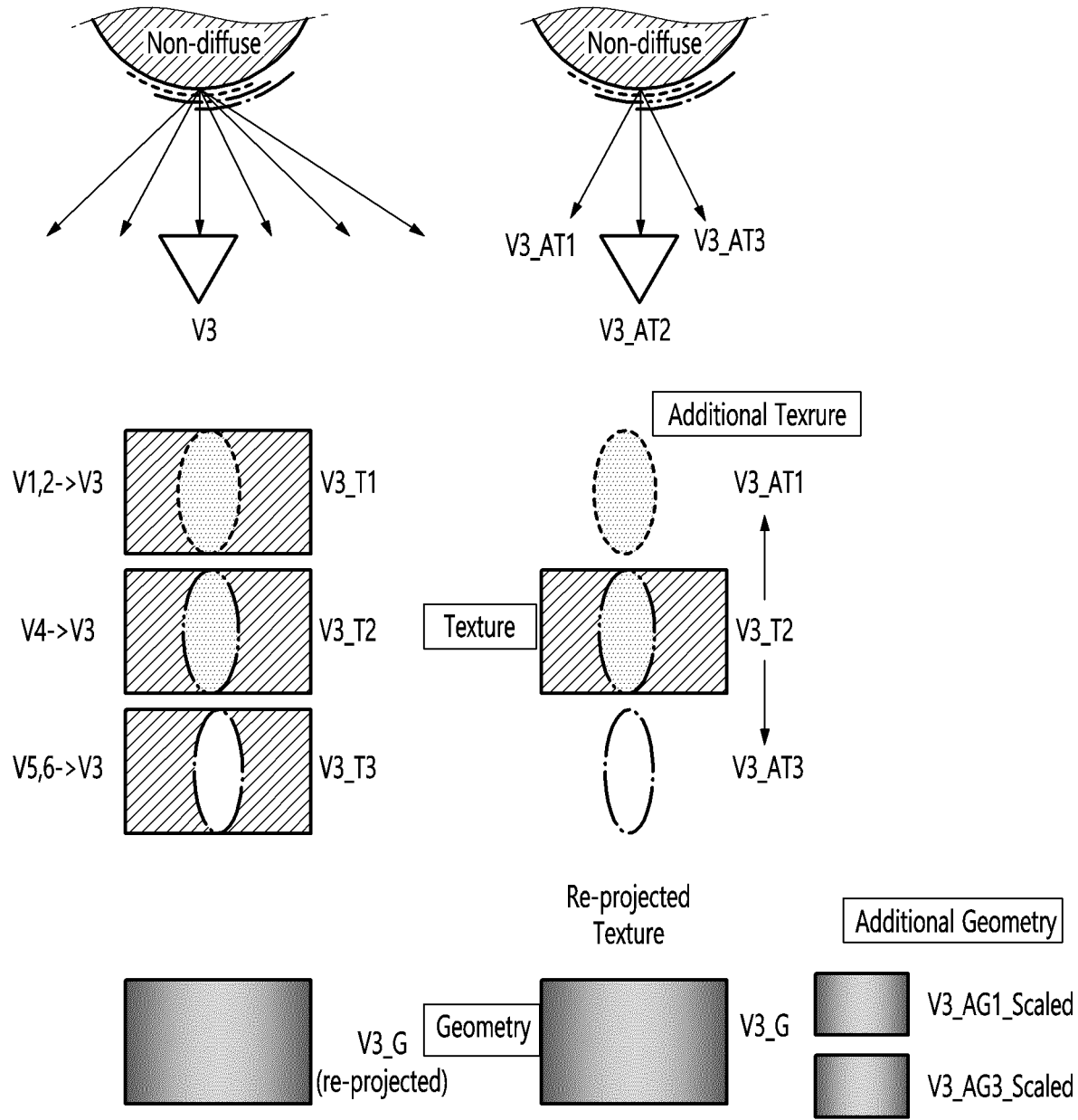

FIG. 9 illustrates a method for generating an atlas for view-dependent rendering according to an embodiment of the present disclosure.

In FIG. 9, an example in which scaled additional depth images V3_AG1 Scaled and V3_AG3 Scaled are generated is illustrated.

As described above, a depth image corresponding to an additional texture image makes a relatively small contribution when view-dependent rendering is performed. Accordingly, the additional depth image having reduced resolution is packed into an atlas, rather than packing the additional depth image having the original size into the atlas, whereby the amount of data to be compressed may be reduced and degradation of image quality at the time of rendering may be minimized.

Here, when the resolution of the additional depth image is adjusted, information related to the reduction ratio of the additional depth image may be encoded/decoded as separate metadata. Here, the information related to the reduction ratio of the additional depth image may be encoded/decoded for each patch. For example, when an additional depth image is treated as a single patch, information indicating at least one of whether scaling is performed, or a scaling ratio, or a combination thereof may be encoded/decoded for the patch. Alternatively, when multiple patches are extracted from the additional depth image, information indicating at least one of whether scaling is performed, or a scaling ratio, or a combination thereof may be encoded/decoded for each of the multiple patches.

That is, reduction ratio information (e.g., scaling-related information) of depth patches (that is, additional depth images) forming a depth atlas may be additionally encoded/decoded as metadata, separately from reduction ratio information (e.g., scaling-related information) of the depth atlas.

For each of view images, information indicating whether the view image includes a non-diffuse surface may be encoded/decoded. When a specific view image is determined to include a non-diffuse surface, at least one of an additional texture image for the view image, or an additional depth image therefor, or a combination thereof may be additionally used when a viewport image is rendered.

Alternatively, information about a subject including a non-diffuse surface may be encoded/decoded. This information may include at least one of information indicating whether an object having a specific entity ID includes a non-diffuse surface, or information indicating an entity ID assigned to an object including a non-diffuse surface, or a combination thereof.

An additional image (an additional texture image and/or an additional depth image) generated based on a non-diffuse surface may be treated as having the same view ID as the view image from which the additional image is derived. Accordingly, encoded/decoded information that is transmitted for the view image may also be applied to the additional image.

In another example, an additional image (an additional texture image and/or an additional depth image) may be assigned a separate view ID. That is, the view ID assigned to the original view image from which the additional image is derived may be different from the view ID assigned to the additional image. In this case, information about the view ID indicating the view of the additional image may be additionally encoded/decoded. In this case, information indicating whether the image corresponding to the view ID is an additional image may be additionally encoded/decoded.

In another example, different view IDs are assigned to view images, and different sub-view IDs may be assigned to additional images. In this case, information about a sub-view ID for identifying an additional image may be additionally encoded/decoded.

The names of the syntax elements introduced in the above-described embodiments are merely names that are provisionally assigned in order to describe embodiments according to the present disclosure. The syntax elements may be referred to using names different from those proposed in the present disclosure.

In the above-described embodiments, although the methods have been described based on flowcharts as a series of steps or units, the present disclosure is not limited to the sequence of the steps, and some steps may be performed in a sequence different from that of the described steps or simultaneously with other steps. Further, those having ordinary knowledge in the art will understand that the steps shown in the flowchart are not exclusive and may further include other steps, or that one or more steps in the flowchart may be deleted without departing from the scope of the present disclosure.

The above-described embodiments include examples in various aspects. Although all possible combinations for indicating various aspects cannot be described, those having ordinary knowledge in the art will appreciate that other combinations are possible. Therefore, it should be noted that the present disclosure includes other replacements, changes, and modifications belonging to the scope of the accompanying claims.

The above-described embodiments according to the present disclosure may be implemented as program instructions that can be executed by various computer components and may be recorded on a computer-readable storage medium. The computer-readable storage medium may include program instructions, data files, and data structures, either solely or in combination. Program instructions recorded on the computer-readable storage medium may have been specially designed and configured for the present disclosure, or may be known to or available to those who have ordinary knowledge in the field of computer software. Examples of the computer-readable storage medium include hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

According to the present disclosure, the quality of an image for a non-diffuse surface, the color value of which changes depending on the viewpoint at the time of rendering, may be prevented from being degraded.

According to the present disclosure, a method for generating multiple texture/depth patches for a single non-diffuse surface may be provided.

The effects obtainable from the present disclosure are not limited to the above-mentioned effects, and other effects that have not been mentioned will be clearly understood by those who have ordinary knowledge in the technical field to which the present disclosure pertains from the description.

As described above, although the present disclosure has been described based on specific details such as detailed components and a limited number of embodiments and drawings, those are merely provided for easy understanding of the entire disclosure, the present disclosure is not limited to those embodiments, and those having ordinary knowledge in the art will practice various changes and modifications from the above description.

Accordingly, it should be noted that the spirit of the present disclosure is not limited to the above-described embodiments, and the accompanying claims and equivalents and modifications thereof fall within the scope of the present disclosure.

What is claimed is:

1. A method for encoding an immersive image, comprising:
   detecting a non-diffuse surface in a first texture image of a first view;
   generating an additional texture image from the first texture image for the non-diffuse surface in the first texture image;
   performing pruning on the additional texture image based on a second texture image of a second view;
   generating at least one texture atlas by packing the pruned additional texture image; and
   encoding the at least one texture atlas,
   wherein the additional texture image corresponds to a partial region of the first texture image in which the non-diffuse surface is included,
   wherein the pruned additional texture image is generated by removing a redundant region, with the second texture image, from the additional texture image, and
   wherein difference information indicates a difference between the additional texture image and the second texture image for the redundant region and is further encoded as metadata.

2. The method of claim 1, wherein:
   the difference information comprises at least one of a difference in an average value in a histogram distribution for the redundant region between the additional texture image and the second texture image, a difference in a standard deviation for the redundant region between the additional texture image and the second texture image, or a ratio of color values of the additional texture image and the second texture image for the redundant region.

3. The method of claim 1, further comprising:
   generating an additional depth image, corresponding to the additional texture image, from a first depth image of the first view,
   wherein the additional depth image corresponds to a partial region of the first depth image in which the non-diffuse surface is included.

4. The method of claim 3, further comprising:
   performing pruning on the additional depth image based on a second depth image of the second view; and
   generating at least one depth atlas by packing the pruned additional depth image.

5. The method of claim 4, further comprising:
   encoding information on a pruning priority for the additional depth image.

6. The method of claim 4, further comprising:
   encoding scaling-related information pertaining to a patch extracted from the pruned additional depth image as metadata.

7. The method of claim 1, wherein:
   a view identifier assigned to the additional texture image is different from a view identifier of the first texture image, and
   a first view identifier indicating the view identifier assigned to the first texture image and a second view identifier indicating the view identifier assigned to the additional texture image are encoded, respectively.

8. A method for decoding an immersive image, comprising:
   decoding a texture atlas; and
   synthesizing a viewport image based on at least one patch extracted from the texture atlas,
   wherein in response to the viewport image comprising a non-diffuse surface, a region, included in the non-diffuse surface, is modified based on difference information decoded from a bitstream,
   wherein the difference information indicates a difference for a redundant region between an additional texture image and a second texture image, and
   wherein the additional texture image corresponds to a partial region of a first texture image in which the non-diffuse surface is included.

9. The method of claim 8, wherein the difference information comprises at least one of a difference in an average value in a histogram distribution for the redundant region between the additional texture image and the second texture image, a difference in a standard deviation for the redundant region between the additional texture image and the second texture image, or a ratio of color values of the additional texture image and the second texture image for the redundant region.

10. The method of claim 8, further comprising:
decoding a depth atlas,
wherein the depth atlas comprises patches extracted from an additional depth image, and
wherein the additional depth image corresponds to a partial region of a first depth image in which the non-diffuse surface is included.

11. The method of claim 10, further comprising:
decoding scaling-related information pertaining to the patch for the non-diffuse surface.

* * * * *